(12) United States Patent
Takahashi

(10) Patent No.: US 12,474,834 B2
(45) Date of Patent: Nov. 18, 2025

(54) MEMORY SYSTEM AND NON-VOLATILE MEMORY STORING TABLE

(71) Applicant: Kioxia Corporation, Tokyo (JP)

(72) Inventor: Keisuke Takahashi, Yokohama Kanagawa (JP)

(73) Assignee: KIOXIA CORPORATION, Tokyo (JP)

( * ) Notice: Subject to any disclaimer, the term of this patent is extended or adjusted under 35 U.S.C. 154(b) by 91 days.

(21) Appl. No.: 18/450,607

(22) Filed: Aug. 16, 2023

(65) Prior Publication Data

US 2024/0094914 A1 Mar. 21, 2024

(30) Foreign Application Priority Data

Sep. 21, 2022 (JP) ................................ 2022-150047

(51) Int. Cl.
| | |
|---|---|
| *G06F 3/06* | (2006.01) |
| *G11C 16/04* | (2006.01) |
| *G11C 16/10* | (2006.01) |
| *G11C 16/26* | (2006.01) |

(52) U.S. Cl.
CPC .......... *G06F 3/0611* (2013.01); *G06F 3/0659* (2013.01); *G06F 3/0679* (2013.01); *G11C 16/0483* (2013.01); *G11C 16/10* (2013.01); *G11C 16/26* (2013.01)

(58) Field of Classification Search
CPC .... G06F 3/0611; G06F 3/0659; G06F 3/0679; G06F 12/0246; G06F 16/951; G06F 2212/1016; G06F 2212/7201; G06F 2212/7208; G06F 3/061; G06F 3/0638; G11C 16/0483; G11C 16/10; G11C 16/26; G11C 16/08
See application file for complete search history.

(56) References Cited

U.S. PATENT DOCUMENTS

| | | | |
|---|---|---|---|
| 6,529,418 B2 | 3/2003 | Matsumoto | |
| 10,055,294 B2 | 8/2018 | Hyun et al. | |
| 11,264,105 B2 | 3/2022 | Yamabe et al. | |
| 2016/0239214 A1* | 8/2016 | Okamoto | G06F 3/0619 |
| 2017/0344288 A1* | 11/2017 | Ho | G06F 3/0619 |
| 2019/0391758 A1* | 12/2019 | Fujiu | G11C 16/0483 |

FOREIGN PATENT DOCUMENTS

| | | |
|---|---|---|
| JP | 2002-288988 A | 10/2002 |
| JP | 2012-203957 A | 10/2012 |
| JP | 2021-140847 A | 9/2021 |

* cited by examiner

*Primary Examiner* — Jane W Benner
(74) *Attorney, Agent, or Firm* — Foley & Lardner LLP

(57) ABSTRACT

A memory system includes a non-volatile memory and a controller. The non-volatile memory includes a memory cell array and a register storing first table data including feature information indicating feature of an address designating a storage area in the memory cell array. The controller can control the non-volatile memory. When receiving address information indicating the address from the controller, the non-volatile memory reads the feature information from the first table data in the register and transmits the feature information to the controller. When receiving the feature information from the non-volatile memory, the controller can execute a response operation in response to a request with respect to the address based on the received feature information.

19 Claims, 13 Drawing Sheets

FIG. 4

WRITE FEATURE MANAGEMENT TABLE — 15D_1

| ADDRESS INFORMATION | WRITE FEATURE INFORMATION |
|---|---|
| ADD1 | CHA_W1 |
| ADD2 | CHA_W2 |
| ADD3 | CHA_W3 |
| ... | ... |

FIG. 5

READ OPERATION SETTING TABLE — 30_2

| WRITE FEATURE INFORMATION | READ OPERATION SETTING INFORMATION |
|---|---|
| CHA_W1 | OPE_R1 |
| CHA_W2 | OPE_R2 |
| CHA_W3 | OPE_R3 |
| ... | ... |

FIG. 9

READ FEATURE MANAGEMENT TABLE — 15D_2

| ADDRESS INFORMATION | READ FEATURE INFORMATION |
|---|---|
| ADD1 | CHA_R1 |
| ADD2 | CHA_R2 |
| ADD3 | CHA_R3 |
| ... | ... |

FIG. 10

WRITE OPERATION SETTING TABLE — 30_3

| READ FEATURE INFORMATION | WRITE OPERATION SETTING INFORMATION |
|---|---|
| CHA_R1 | OPE_W1 |
| CHA_R2 | OPE_W2 |
| CHA_R3 | OPE_W3 |
| ... | ... |

FIG. 14

| FEATURE MANAGEMENT TABLE | | ~15D_3 |
|---|---|
| ADDRESS INFORMATION | FEATURE INFORMATION |
| ADD1 | CHA_1 |
| ADD2 | CHA_2 |
| ADD3 | CHA_3 |
| ... | ... |

FIG. 15

| OPERATION SETTING TABLE | | | ~30_4 |
|---|---|---|
| FEATURE INFORMATION | READ OPERATION SETTING INFORMATION | WRITE OPERATION SETTING INFORMATION |
| CHA_1 | OPE_R1 | OPE_W1 |
| CHA_2 | OPE_R2 | OPE_W2 |
| CHA_3 | OPE_R3 | OPE_W3 |
| ... | ... | ... |

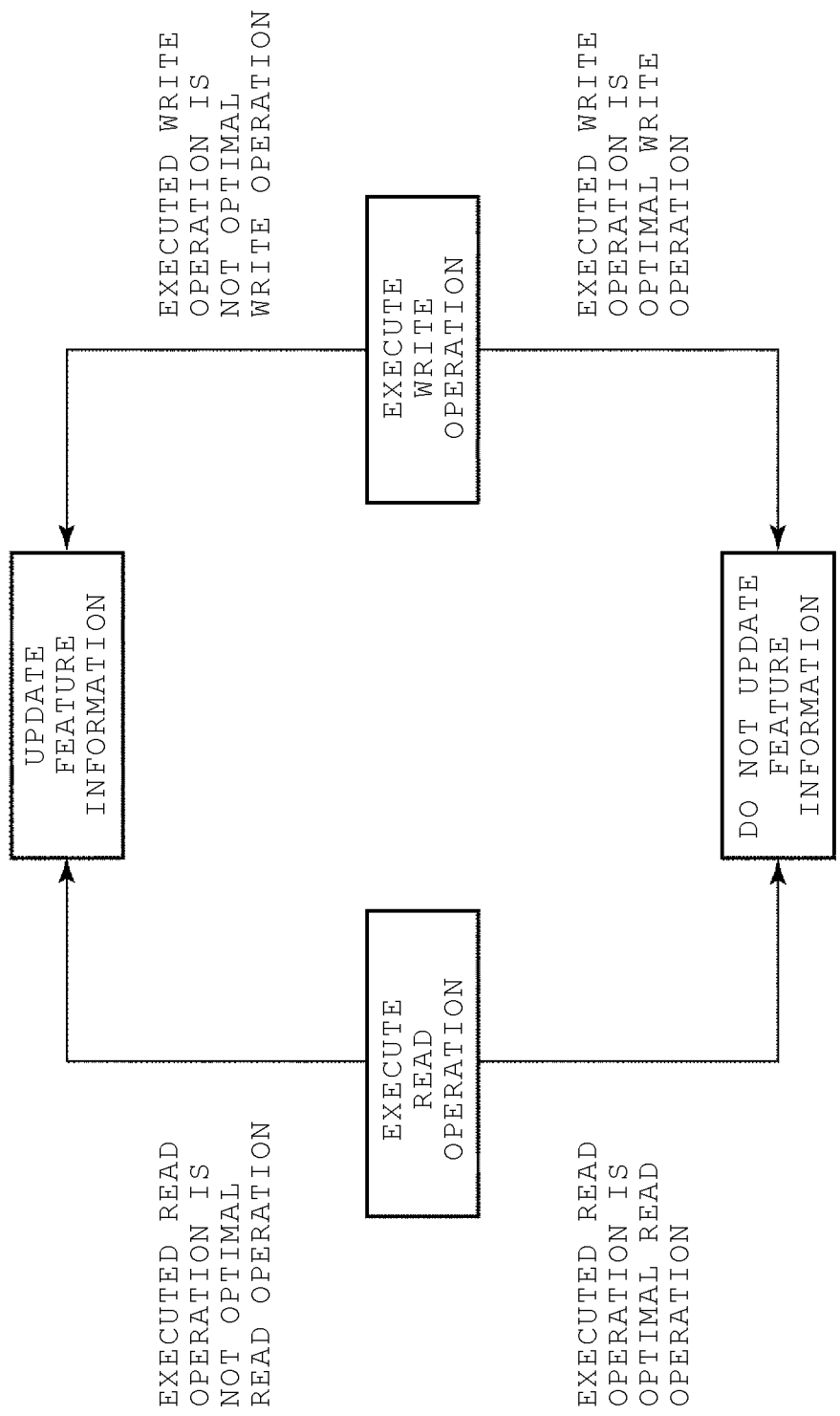

MEMORY SYSTEM AND NON-VOLATILE MEMORY STORING TABLE

CROSS-REFERENCE TO RELATED APPLICATION(S)

This application is based upon and claims the benefit of priority from Japanese Patent Application No. 2022-150047, filed Sep. 21, 2022, the entire contents of which are incorporated herein by reference.

FIELD

Embodiments described herein relate generally to a memory system and a non-volatile memory.

BACKGROUND

A NAND flash memory is one type of a non-volatile memory. When reading data from a specific address in the NAND flash memory, a memory controller controlling the NAND flash memory reads the data from the specific address by executing a certain read operation without considering the feature of the specific address. Similarly, when writing data to the specific address in the NAND flash memory, the memory controller writes the data to the specific address by executing a certain write operation without considering the feature of the specific address.

However, respective addresses in the NAND flash memory may have different features.

DESCRIPTION OF THE DRAWINGS

FIG. 4 illustrates an example of a write feature management table according to the embodiment;

FIG. 5 illustrates an example of a read operation setting table according to the embodiment;

FIG. 9 illustrates an example of a read feature management table according to the embodiment;

FIG. 10 illustrates an example of a write operation setting table according to the embodiment;

FIG. 14 illustrates an example of a feature management table according to the embodiment;

FIG. 15 illustrates an example of an operation setting table according to the embodiment; and FIG. 16 is a diagram illustrating an update process in the memory system according to the embodiment.

DETAILED DESCRIPTION

Embodiments provide a memory system and a non-volatile memory capable of improving response performance.

In general, according to one embodiment, a memory system includes a non-volatile memory and a controller. The non-volatile memory includes a memory cell array and a register storing first table data including feature information indicating feature of an address designating a storage area in the memory cell array. The controller can control the non-volatile memory. When receiving address information indicating the address from the controller, the non-volatile memory reads the feature information from the first table data in the register and transmits the feature information to the controller. When receiving the feature information from the non-volatile memory, the controller can execute a response operation in response to a request with respect to the address based on the received feature information.

Hereinafter, embodiments will be described with reference to the drawings.

Figure 1:
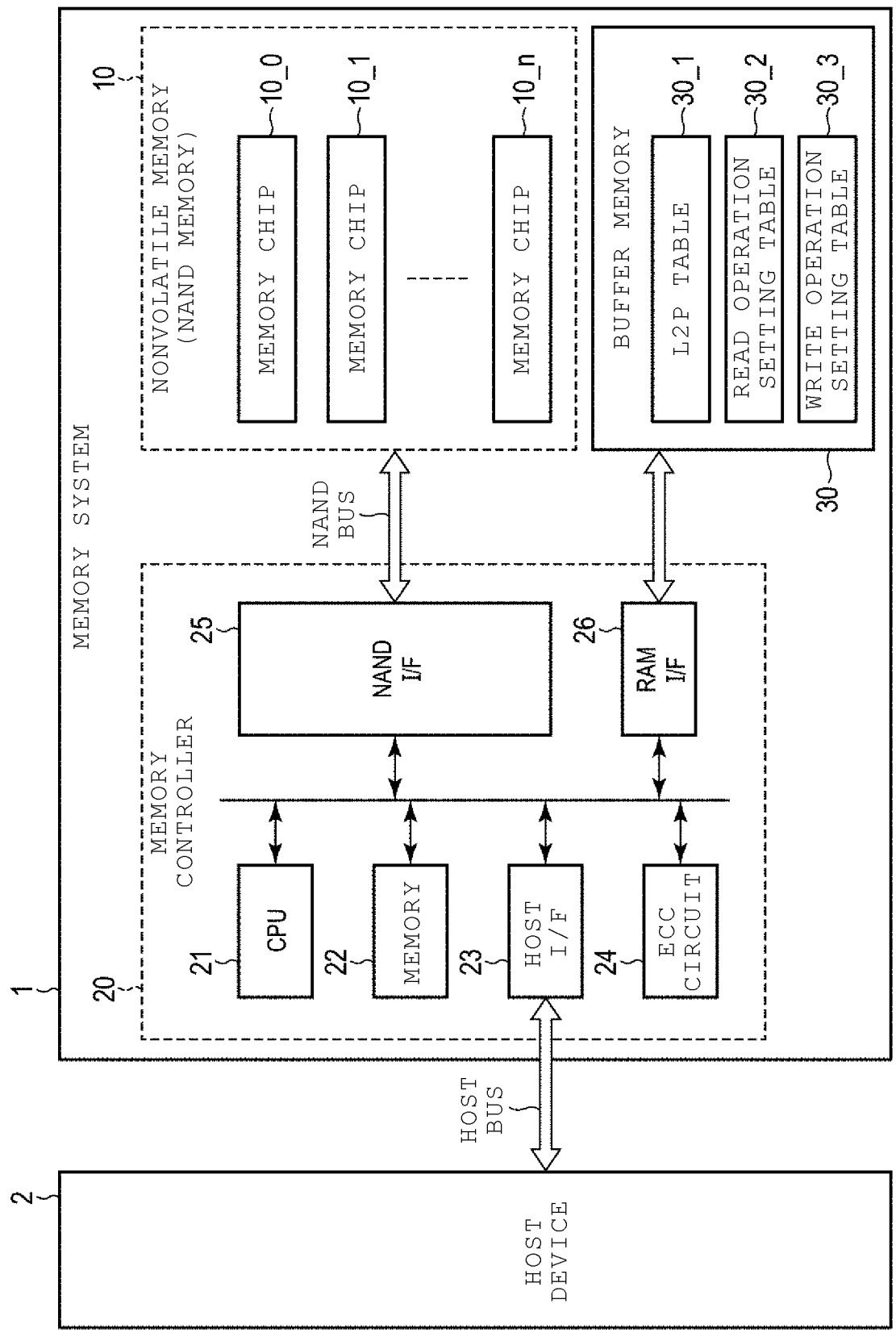
FIG. 1 is a block diagram illustrating a configuration example of a memory system according to an embodiment.

FIG. 1 is a block diagram illustrating a configuration example of a memory system 1 according to the embodiment. The memory system 1 includes a non-volatile memory 10, a memory controller 20, and a buffer memory 30. The memory system 1 is connected to an external host device 2 and can execute various operations in response to a request from the host device 2.

The non-volatile memory 10 includes one or a plurality of memory chips 10_0, 10_1, 10_2, ..., and 10_n (where n is a natural number of 0 or more). The memory chip 10_n includes a plurality of memory cells and stores data in a non-volatile manner. An example of the non-volatile memory 10 is a NAND flash memory. Hereinafter, in the description, the non-volatile memory 10 is referred to as a NAND memory 10. A detailed configuration of the NAND memory 10 will be described later.

The memory controller 20 is connected to the NAND memory 10 via a NAND bus. The NAND bus is a bus conforming to the NAND interface. The memory controller 20 is connected to the host device 2 via a host bus. The memory controller 20 controls the NAND memory 10. The memory controller 20 accesses the NAND memory 10 in response to the request received from the host device 2. Herein, the accessing refers to reading data from the NAND memory 10 or writing data to the NAND memory 10.

The buffer memory 30 temporarily stores write data and read data transmitted and received between the NAND memory 10 and the host device 2. The buffer memory 30 is configured with, for example, a dynamic random access memory (DRAM), a static random access memory (SRAM), or the like.

The NAND memory 10 and the memory controller 20 may configure one semiconductor device, for example, by combination thereof. The semiconductor device is, for example, a memory card including an SD™ card. The semiconductor device may be a solid state drive (SSD) or the like. The memory controller 20 may be, for example, a system-on-a-chip (SoC).

The host device 2 is, for example, a personal computer, a server computer, a mobile device, or an in-vehicle device. The host bus is, for example, a bus conforming to an SD™ interface.

Herein, a configuration of the memory controller 20 will be described. The memory controller 20 includes a central process unit (CPU) 21, a memory 22, a host interface (host I/F) 23, an error checking and correcting (ECC) circuit 24, a NAND interface (NAND I/F) 25, and a RAM interface (RAM I/F) 26.

The CPU 21 is a processor. The CPU 21 controls the entire operations of the memory controller 20.

For example, when receiving a write request from the host device 2, the CPU 21 issues a write command to the NAND interface 25. The write request is a request to write data to the memory system 1 (NAND memory 10) and designates write target data (user data) and a logical address of the user data.

When receiving a read request from the host device 2, the CPU 21 issues a read command to the NAND interface 25. The read request is a request to read data from the memory system 1 (NAND memory 10) and includes a logical address of read target data (read data).

Although detailed description is omitted here, the CPU 21 operates in the same manner when receiving an erase request.

In addition, the CPU 21 manages data stored in the NAND memory 10 and blocks provided in the NAND memory 10.

The management of the data stored in the NAND memory 10 includes, for example, the management of mapping information indicating a corresponding relation between each logical address and each physical address. The logical address is an address used by host device 2 to designate a position within a logical address space of the memory system 1 as the address. The logical address is, for example, a logical block address (LBA). The CPU 21 manages the mapping between each logical address and each physical address by using a logical-to-physical address conversion table (L2P table) 30_1. In addition, the management of the blocks provided in the NAND memory 10 includes, for example, garbage collection (compaction), defective block (bad block) management, and wear leveling.

The operation of the memory controller 20 to be described later may be implemented, for example, by the CPU 21 loading a control program (firmware) stored in the NAND memory 10 or a ROM (not illustrated) into the memory 22 and executing the firmware or may be implemented by hardware. It is noted that the firmware may be loaded into the buffer memory 30 instead of the memory 22.

The memory 22 is, for example, a semiconductor memory such as a DRAM or an SRAM, and is used as a work area for the CPU 21.

The host interface 23 is connected to the host device 2 via the host bus and controls communication with the host device 2. The host interface 23 transfers the request and data received from the host device 2 to the CPU 21, memory 22, buffer memory 30, and the like. The host interface 23 transmits data based on the read data temporarily stored in the buffer memory 30 to the host device 2 in response to a request from the CPU 21.

The ECC circuit 24 generates a parity for error correction (ECC parity) with respect to the user data and generates a codeword containing the generated ECC parity and the user data. In addition, the ECC circuit 24 executes an error correction process on the data read from the NAND memory 10.

The CPU 21 causes the ECC circuit 24 to generate the codeword with respect to the user data, and writes the generated codeword as write data to the NAND memory 10 via the NAND interface 25 to be described later. That is, the CPU 21 generates write data based on the user data designated by the write request, and writes the write data to the NAND memory 10.

The NAND interface 25 is connected to the NAND memory 10 via the NAND bus and controls communication with the NAND memory 10. The NAND interface 25 transmits various signals to the NAND memory 10 and receives various signals from the NAND memory 10 in response to the request from the CPU 21. Various signals transmitted and received between the NAND interface 25 and the NAND memory 10 include write data and read data.

Next, various tables stored in the buffer memory 30 will be described. The buffer memory 30 stores the L2P table 30_1, a read operation setting table 30_2, and a write operation setting table 30_3. These tables 30_1, 30_2, and 30_3 are loaded from the NAND memory 10 into the buffer memory 30, for example, when the memory system 1 is powered on.

The L2P table 30_1 manages the mapping between each logical address and each physical address in units of the predetermined size such as a sector.

The read operation setting table 30_2 manages information (setting information) on a setting for executing a read operation, and the write operation setting table 30_3 manages information (setting information) on a setting for executing a write operation. Details of the read operation setting table 30_2 and the write operation setting table 30_3 will be described later.

Figure 2:
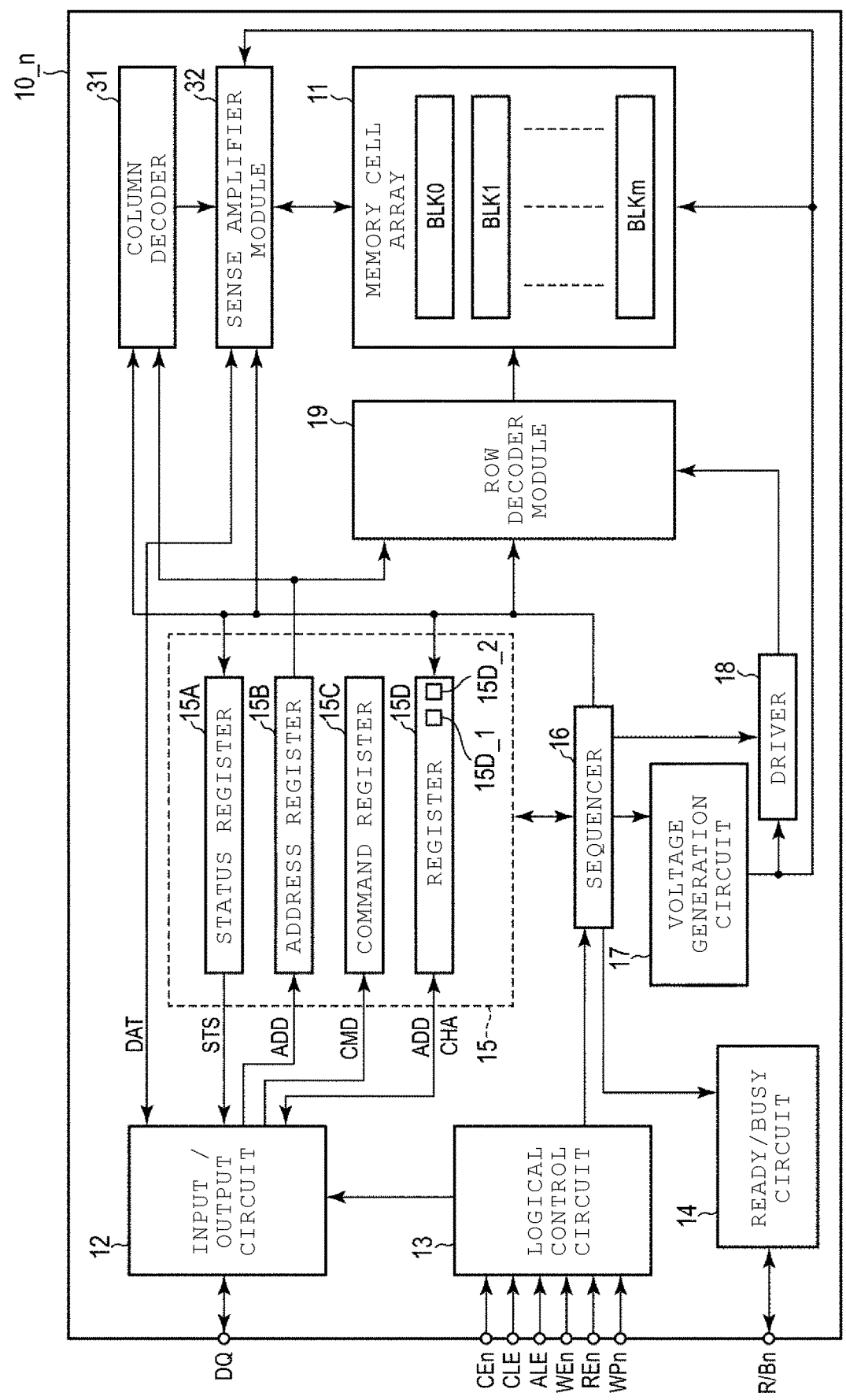
FIG. 2 is a block diagram illustrating a configuration example of a memory chip according to the embodiment.

Next, a configuration of the memory chip 10_n will be described with reference to FIG. 2. FIG. 2 is a block diagram illustrating a configuration example of the memory chip 10_n in the NAND memory 10. The memory chip 10_n includes a memory cell array 11, an input/output circuit 12, a logical control circuit 13, a ready/busy circuit 14, a register group 15, a sequencer (or control circuit) 16, a voltage generation circuit 17, a driver 18, a row decoder module 19, a column decoder 31, and a sense amplifier module 32. The register group 15 includes a status register 15A, an address register 15B, a command register 15C, and a register 15D.

The memory cell array 11 includes one or a plurality of blocks BLK0, BLK1, BLK2, . . . , and BLKm (where m is an integer of 0 or more). Each of the plurality of blocks BLK0 to BLKm includes a plurality of memory cell transistors (hereinafter simply referred to as memory cells) correlated with rows and columns. The memory cell is an electrically erasable and programmable non-volatile memory cell. The memory cell array 11 includes a plurality of word lines, a plurality of bit lines and source lines for applying voltages to the memory cells. In the following description, when a block BLKr (where r is an integer from 0 to m) is denoted, the block BLKr indicates each of the blocks BLK0 to BLKm.

The input/output circuit 12 and the logical control circuit 13 are connected to the memory controller 20 via input/output terminals (or the NAND bus). The input/output circuit 12 transmits and receives an I/O signal DQ to and from the memory controller 20 via the input/output terminals. The I/O signal DQ includes commands, addresses, data (read data, write data), and the like.

The logical control circuit 13 receives external control signals from the memory controller 20 via the input/output terminals (or the NAND bus). The external control signals include, for example, a chip enable signal CEn, a command latch enable signal CLE, an address latch enable signal ALE, a write enable signal WEn, a read enable signal REn, and a write protect signal WPn. The "n" appended to the signal name indicates that the signal is active low.

The chip enable signal CEn enables selection of the memory chip 10_n and is asserted when selecting the memory chip 10_n. The command latch enable signal CLE enables commands transmitted as the I/O signal DQ to be latched in the command register 15C. The address latch enable signal ALE enables addresses transmitted as the I/O signal DQ to be latched in the address register 15B. The write enable signal WEn enables data (write data) transmitted as the I/O signal DQ to be stored in the input/output circuit 12. The read enable signal REn enables data (read data) read from the memory cell array 11 to be transmitted as the I/O signal DQ. The write protect signal WPn is asserted when protecting writing and erasing with respect to the memory chip 10_n.

The ready/busy circuit 14 generates a ready/busy signal R/Bn under control of the sequencer 16. The ready/busy signal R/Bn indicates whether the memory chip 10_n is in a ready state or a busy state. The ready state indicates a state where a command from the memory controller 20 can be received. The busy state indicates a state where the command from the memory controller 20 cannot be received. By receiving the ready/busy signal R/Bn from the memory chip 10_n, the memory controller 20 can know whether the memory chip 10_n is in the ready state or the busy state.

The status register 15A stores status information STS required for the operation of the memory chip 10_n and transfers the status information STS to the input/output circuit 12 based on the instruction of the sequencer 16.

The address register 15B stores a physical address ADD transferred from the input/output circuit 12. The physical address ADD includes a row address and a column address designating a storage area in the memory cell array 11. The row address includes, for example, a block address designating the block BLKr of an operation target, and a page address designating the word lines of an operation target in the designated block.

The command register 15C stores a command CMD transferred from the input/output circuit 12. The command CMD includes, for example, the write command that commands the sequencer 16 to execute the write operation, the read command that commands the sequencer 16 to execute the read operation, and the like.

The register 15D stores the write feature management table 15D_1 and the read feature management table 15D_2 loaded from the memory cell array 11. These tables 15D_1 and 15D_2 are loaded from the memory cell array 11 into the register 15D when the memory system 1 is powered on, and are stored in the memory cell array 11 when the memory system 1 is powered off. Details of the write feature management table 15D_1 and the read feature management table 15D_2 will be described later.

The status register 15A, the address register 15B, the command register 15C, and the register 15D are configured with, for example, SRAMs.

The sequencer 16 receives the command from the command register 15C and controls the memory chip 10_n according to the sequence based on this command. The sequencer 16 controls the row decoder module 19, the column decoder 31, the sense amplifier module 32, the voltage generation circuit 17, and the like to execute write, read, and erasing operations. Specifically, the sequencer 16 controls the row decoder module 19, the driver 18, and the sense amplifier module 32 based on the write command received from the command register 15C to write data to the memory cell designated by the physical address ADD. The sequencer 16 controls the row decoder module 19, the driver 18, the column decoder 31, and the sense amplifier module 32 based on the read command received from the command register 15C to read data from the memory cell designated by the physical address ADD. The sequencer 16 controls the row decoder module 19, the driver 18, the column decoder 31, and the sense amplifier module 32 based on an erase command received from the command register 15C to erase the data stored in the block designated by the physical address ADD.

The voltage generation circuit 17 receives a power supply voltage from the outside of the memory chip 10_n through a power supply terminal (not illustrated). Under the control of the sequencer 16, the voltage generation circuit 17 generates a plurality of voltages required for write, read, and erasing operations by using the power supply voltage. The voltage generation circuit 17 supplies the generated voltage to the memory cell array 11, the driver 18, the sense amplifier module 32, and the like.

The driver 18 receives a plurality of voltages from the voltage generation circuit 17. The driver 18 supplies the plurality of voltages selected from among the plurality of voltages supplied from the voltage generation circuit 17 according to the write operation, the read operation, and the erasing operation to the row decoder module 19 via a plurality of signal lines.

The row decoder module 19 receives the row address from the address register 15B and decodes this row address. The row decoder module 19 selects one of the plurality of blocks based on the decoding result of the row address and further selects the word line in the selected block BLKr. The row decoder module 19 transfers the plurality of voltages supplied from the driver 18 to the selected block BLKr.

The column decoder 31 receives the column address from the address register 15B and decodes this column address. The column decoder 31 selects the bit line based on the decoding result of the column address.

The sense amplifier module 32 senses and amplifies the data read from the memory cells on the bit lines during the read operation. In addition, the sense amplifier module 32 temporarily stores data DAT (read data) read from the memory cells and transfers the stored data DAT (read data) to the input/output circuit 12. The sense amplifier module 32 also temporarily stores data DAT (write data) transferred from the input/output circuit 12 during the write operation. In addition, the sense amplifier module 32 transfers the data DAT (write data) to the bit lines.

Figure 3:
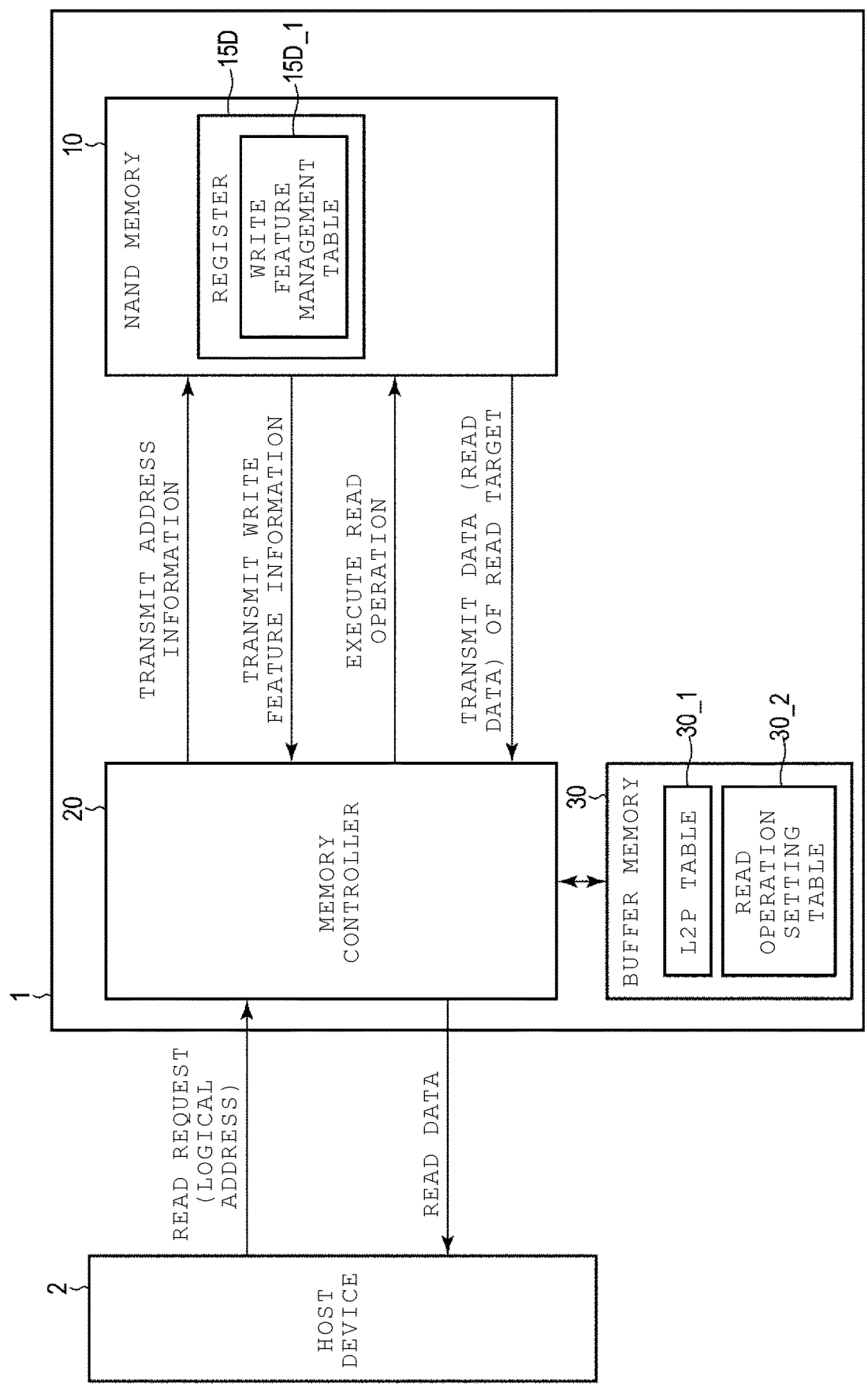
FIG. 3 is a diagram illustrating a read operation in the memory system according to the embodiment.

FIG. 3 is a diagram illustrating an overview of the read operation executed in the memory system 1 according to the present embodiment.

First, when receiving the read request from the host device 2, the memory controller 20 converts the logical address provided in the received read request into the physical address ADD by using the L2P table 30_1 stored in the buffer memory 30. After that, the memory controller 20 transmits the physical address ADD (that is, the physical address ADD indicating the storage position of the read data) obtained by using the L2P table 30_1 to the NAND memory 10 as address information. At this time, the memory controller 20 may issue the read command in response to the read request received from the host device 2 and transmit the read command together with the address information to the NAND memory 10.

When receiving the address information from the memory controller 20, the NAND memory 10 specifies write feature information corresponding to the received address information by using the write feature management table 15D_1 stored in the register 15D and transmits the specified write feature information to the memory controller 20.

Herein, the write feature management table 15D_1 stored in the register 15D will be described with reference to FIG. 4. FIG. 4 illustrates an example of the write feature management table 15D_1. The write feature management table 15D_1 manages the feature of each address of the NAND memory 10, which is the feature related to data writing. As illustrated in FIG. 4, the address information and the write feature information are correlated with each other in the write feature management table 15D_1. The address information indicates the physical address ADD (for example, physical addresses ADD1, ADD2, ADD3, and the like) designating the memory cell provided in the NAND memory 10. The write feature information indicates write feature CHA_W (for example, write feature CHA_W1, CHA_W2, CHA_W3, and the like) and indicates information on the operation content which is required for writing data to the memory cell designated by the correlated address information (physical address ADD). For example, the write feature information indicates the number of times of write voltage application when the data is written to the memory cell designated by the correlated address information (physical address ADD) as the write feature CHA_W.

Referring again to FIG. 3, when receiving the write feature information from the NAND memory 10, the memory controller 20 specifies the read operation setting information corresponding to the received write feature information by using the read operation setting table 30_2 stored in the buffer memory 30 and executes the read operation based on the specified read operation setting information. The memory controller 20 transmits at least the read command corresponding to the read request received from the host device 2 and the physical address ADD indicating the storage position of the read data to the NAND memory 10 and further transmits the command based on the specified read operation setting information to the NAND memory 10, as needed. Details will be described later.

Herein, the read operation setting table 30_2 stored in the buffer memory 30 will be described with reference to FIG. 5. FIG. 5 illustrates an example of the read operation setting table 30_2 stored in the buffer memory 30. As illustrated in FIG. 5, in the read operation setting table 30_2, the write feature information and the read operation setting information are correlated with each other. The read operation setting information indicates a read operation setting OPE_R (for example, read operation settings OPE_R1, OPE_R2, OPE_R3, and the like), and indicates information on the settings executing the read operation of reading data from a memory cell at an address having the write feature CHA_W indicated by the correlated write feature information.

For example, the read operation setting information indicates an optimal read voltage value when reading data from the memory cell at the address having the write feature CHA_W indicated by the correlated write feature information as the read operation setting OPE_R. According to this, the memory controller 20 can execute the read operation using the optimal read voltage value for the memory cell designated by the physical address ADD corresponding to the logical address provided in the read request received from the host device 2. It is noted that, in the read operation of the present embodiment, the optimum denotes that desirable results are obtained with respect to, for example, error correction, time, and power consumption. Specifically, for example, the optimal read voltage is a read voltage at which the ECC circuit 24 executes the least error correction on the read read data. In addition, the optimal read voltage may be a read voltage that takes the shortest time to complete the read operation. The optimal read voltage may be a read voltage that consumes the least power in the read operation. In other words, the optimum denotes that desirable results are obtained with respect to the conditions.

For example, the read operation setting information indicates whether to use an auxiliary function to read data from the memory cell at the address having the write feature CHA_W indicated by the correlated write feature information, and an optimal auxiliary function as the read operation setting OPE_R when using the auxiliary function. According to this, the memory controller 20 can execute the read operation (for example, a direct look ahead (DLA) read operation and the like) using the optimal auxiliary function for the memory cell designated by the physical address ADD corresponding to the logical address provided in the read request received from the host device 2, as needed. The DLA read operation is a read operation of changing the read voltage value based on the reading result from the memory cells connected to the word lines adjacent to the selected word line and reading the memory cells connected to the selected word line.

For example, the read operation setting information indicates the optimal function used to read data from the memory cell at the address having the write feature CHA_W indicated by the correlated write feature information as the read operation setting OPE_R. According to this, the memory controller 20 can execute the read operation (for example, a soft-determination read operation (soft bit read), on-chip tracking read (on-chip Vth tracking read), and the like) using the optimal function for the memory cell designated by the physical address ADD corresponding to the logical address provided in the read request received from the host device 2. The on-chip tracking read is a read operation executed in the non-volatile memory without depending on control from the memory controller.

Referring back to FIG. 3, the description will be made. When receiving at least the read command and the physical address ADD from the memory controller 20, the NAND memory 10 reads the data (read data) stored in the memory cell designated by the received physical address ADD and transmits the read data to the memory controller 20.

When receiving the read data from the NAND memory 10, the memory controller 20 transmits the received read data (more specifically, data based on the received read data) to the host device 2 and ends a series of read operations.

Figure 6:
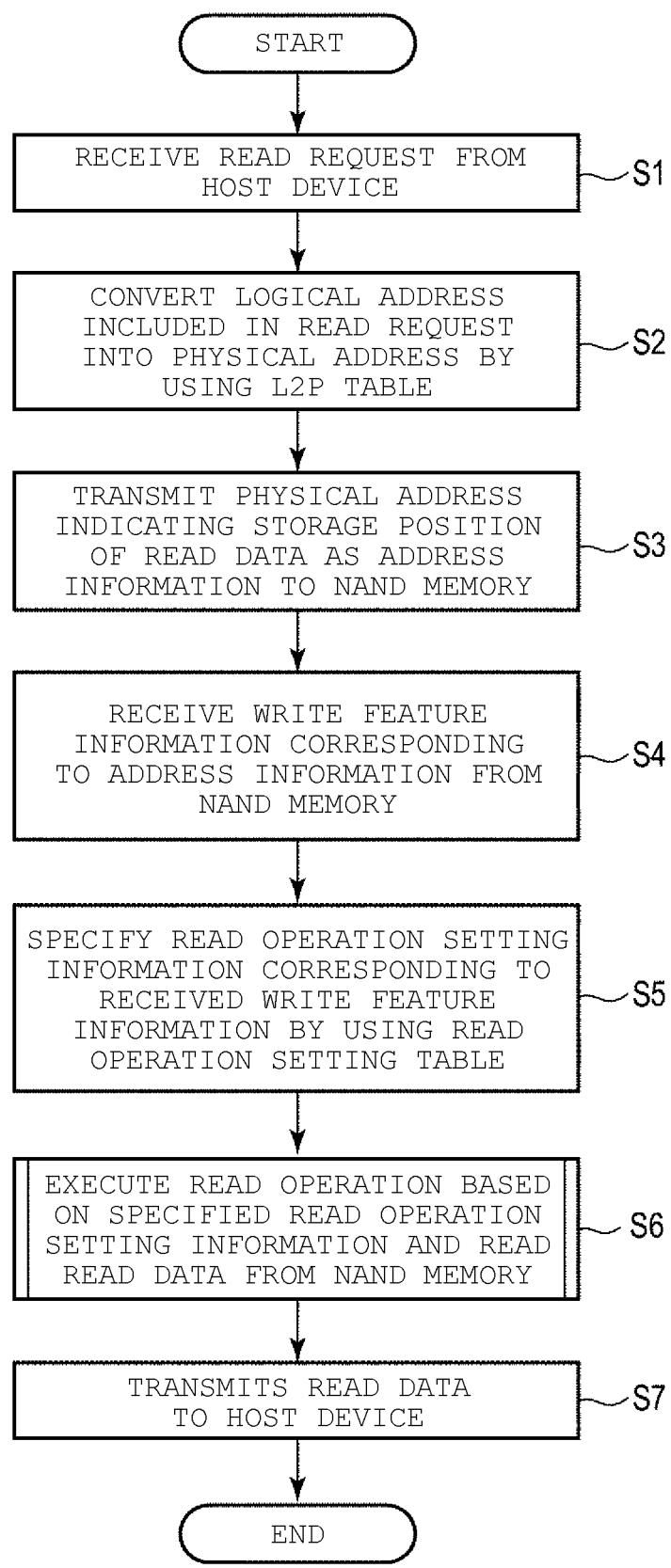
FIG. 6 is a flowchart illustrating an operation executed on a memory controller side of the read operation illustrated in FIG. 3.

FIG. 6 is a flowchart illustrating in more detail the operations executed on the memory controller 20 side of the series of read operations illustrated in FIG. 3.

First, the host interface 23 receives the read request from the host device 2 (step S1). The received read request is transferred from the host interface 23 to the CPU 21.

When receiving the read request transferred from the host interface 23, the CPU 21 converts the logical address provided in the read request into the physical address by using the L2P table 30_1 stored in the buffer memory 30 and specifies the physical address ADD indicating the storage position of the read data (step S2). The physical address ADD indicating the storage position of the read data is transferred from the CPU 21 to the NAND interface 25 as the address information.

When receiving the address information transferred from the CPU 21, the NAND interface 25 transmits the address information to the NAND memory 10 (step S3), and receives the write feature information corresponding to the address information from the NAND memory 10 (step S4). The received write feature information is transferred from the NAND interface 25 to the CPU 21.

When receiving the write feature information transferred from the NAND interface 25, the CPU 21 specifies the read operation setting information corresponding to the write feature information by using the read operation setting table 30_2 stored in the buffer memory 30 (step S5). After that, the CPU 21 executes the read operation based on the specified read operation setting information and reads the read data from the NAND memory 10 (step S6). It is noted that the process of step S6 will be described in more detail later.

After that, the CPU 21 causes the ECC circuit 24 to execute the error correction process on the read data read from the NAND memory 10 and transmits the read data, on which the error correction process is executed, to the host device 2 via the host interface 23 (step S7). That is, the memory controller 20 transmits data based on the read data read from the NAND memory 10 to the host device 2.

Figure 7:
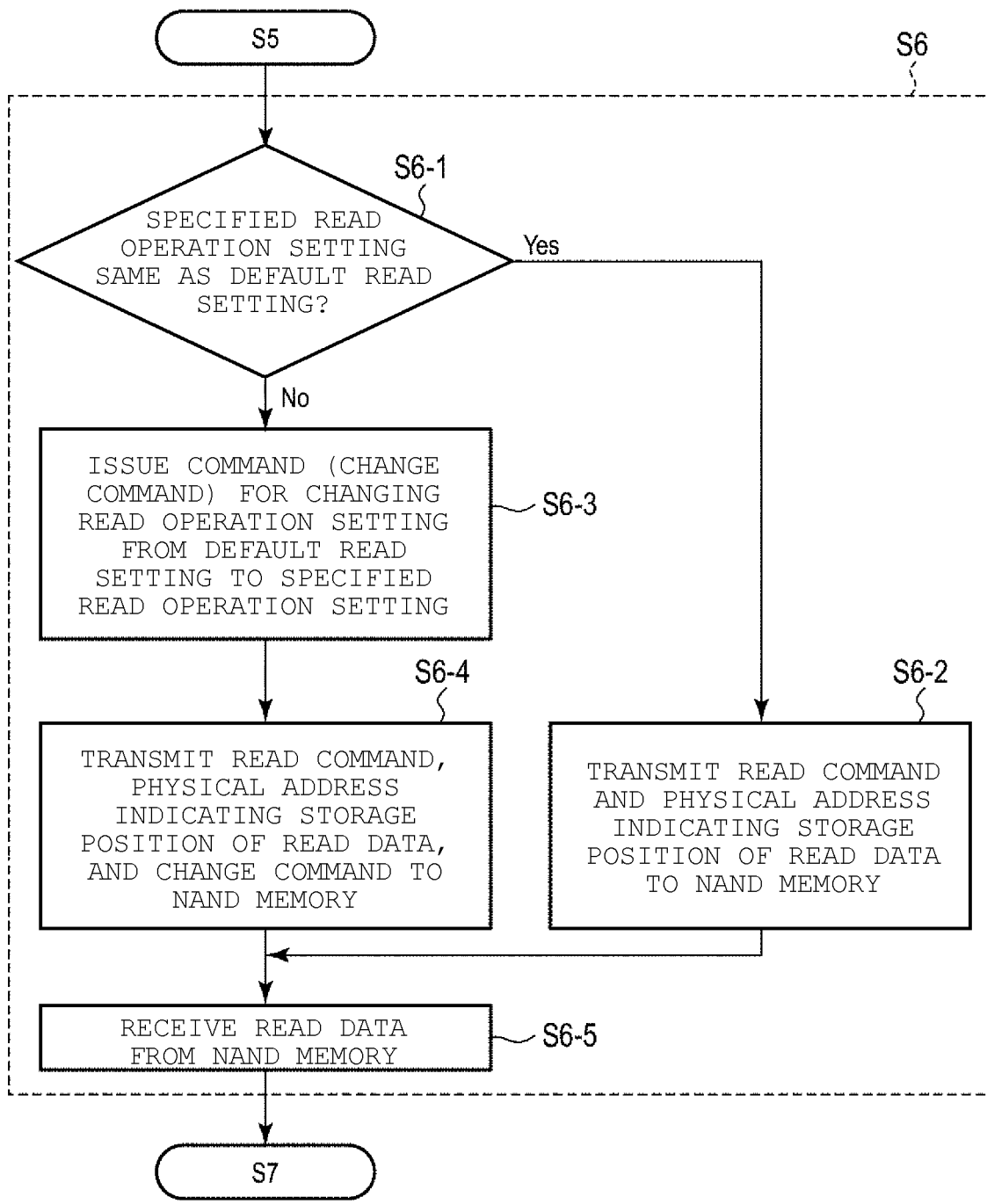
FIG. 7 is a detailed flowchart of a process of step S6 illustrated in FIG. 6.

FIG. 7 is a flowchart illustrating in more detail the process of step S6 illustrated in FIG. 6.

First, the CPU 21 determines whether the read operation setting OPE_R indicated by the read operation setting information specified in the process of step S5 is the same as a default read operation setting (hereinafter referred to as a default read setting) (step S6-1).

In the process of step S6-1, when it is determined that the read operation setting OPE_R is the same as the default read setting (Yes in step S6-1), the CPU 21 determines that there is no need to change the read operation setting in order to execute the read operation on the memory cell designated by the physical address ADD specified in the process of step S2. The CPU 21 issues the read command in response to the read request received from the host device 2, transmits the read command and the physical address ADD indicating the storage position of the read data to the NAND memory 10 via the NAND interface 25 (step S6-2), and proceeds to the process of step S6-5 to be described later.

On the other hand, in the process of step S6-1, when it is determined that the read operation setting OPE_R is different from the default read setting (No in step S6-1), the CPU 21 determines that the read operation setting needs to be changed in order to execute the read operation on the memory cell designated by the physical address ADD specified in the process of step S2. The CPU 21 issues a command (change command) for changing the read operation setting from the default read setting to the read operation setting OPE_R (step S6-3).

After that, the CPU 21 issues the read command in response to the read request received from the host device 2 and transmits the read command, the physical address ADD indicating the storage position of the read data, and the change command issued in the process of step S6-3 to the NAND memory 10 via the NAND interface 25 (step S6-4). After that, the NAND interface 25 receives the read data from the NAND memory 10, transfers the received read data to the host interface 23 (step S6-5), and proceeds to the process of step S7.

As described above, the register 15D of the NAND memory 10 can store the write feature management table 15D_1, and the buffer memory 30 of the memory controller 20 can store the read operation setting table 30_2, so that the memory system 1 can specify the write feature CHA_W of the physical address ADD indicating the storage position of the read data and can specify and apply the optimal read operation setting OPE_R (for example, the optimal read voltage value, the optimal auxiliary function, the optimal function, and the like) for the memory cell designated by the physical address ADD based on the write feature CHA_W. According to this, since the memory system 1 can execute the read operation with the optimal read operation setting OPE_R (for example, the optimal read voltage value, the optimal auxiliary function, the optimal function, and the like) for the memory cell designated by the physical address ADD indicating the storage position of the read data, a data reading accuracy and a data reading speed can be improved.

In addition, since the write feature management table 15D_1 is stored in the register 15D in the NAND memory 10, the NAND memory 10 can specify the write feature information (write feature CHA_W) corresponding to the address information (physical address ADD) received from the memory controller 20 in a short period of time and can transmit the write feature information to the memory controller 20 in a short period of time.

Furthermore, in the read operation described above, since the optimal read operation setting OPE_R (for example, the optimal read voltage value, the optimal auxiliary function, the optimal function, and the like) for the memory cell designated by the physical address ADD is specified based on the write feature CHA_W of the physical address ADD indicating the storage position of the read data, the memory system 1 can read the read data with the optimal read operation setting OPE_R (for example, the optimal read voltage value, the optimal auxiliary function, the optimal function, and the like) from when reading the read data for the first time.

In addition, as described above, the memory controller 20 may simply specify and apply the read operation setting OPE_R based on the write feature information (write feature CHA_W) received from the NAND memory 10. Since the memory controller 20 can specifically determine what kind of read operation the memory controller 20 associates the read operation setting OPE_R with, the memory controller 20 has a degree of freedom in operation selection.

Figure 8:
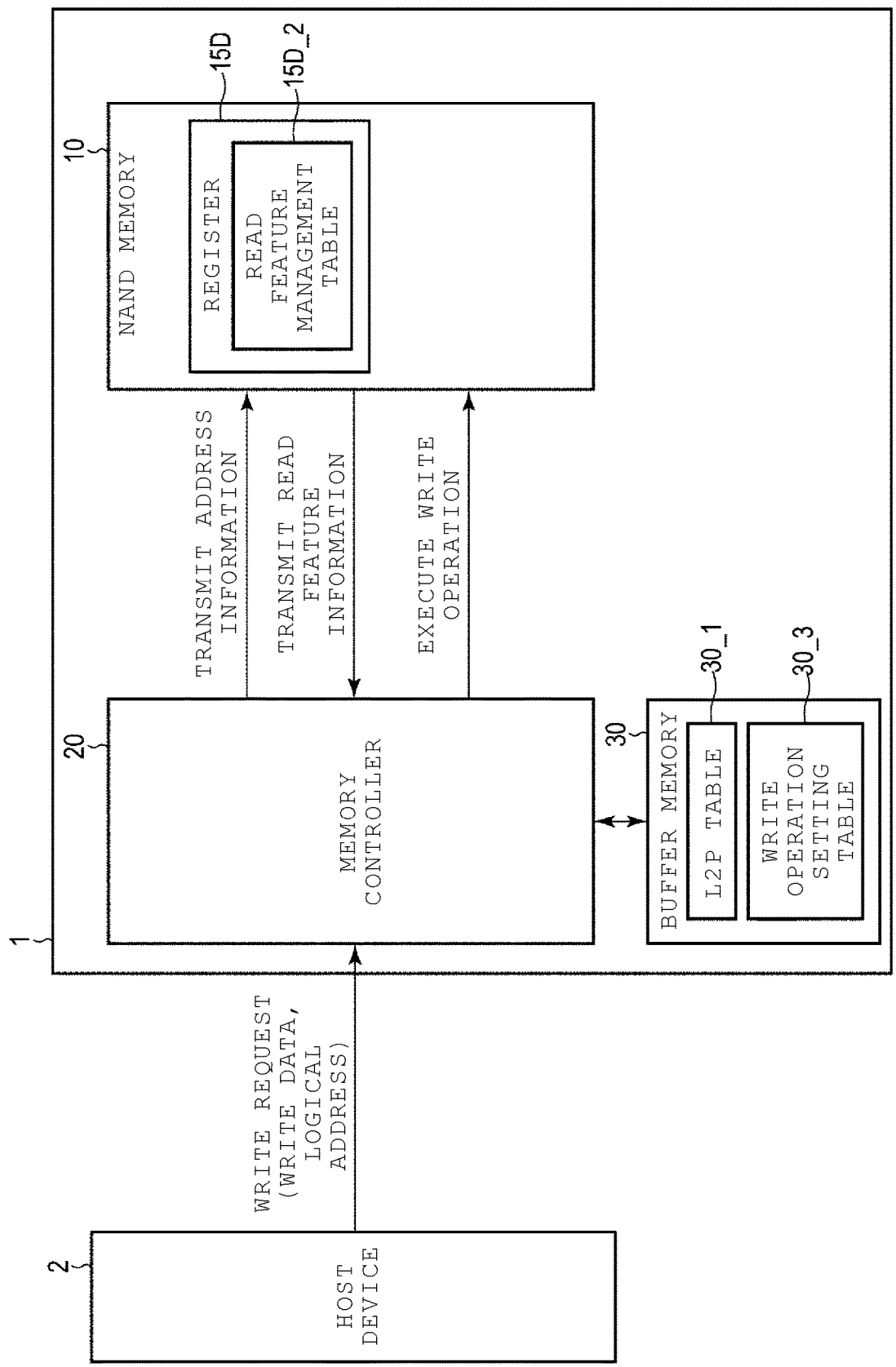
FIG. 8 is a diagram illustrating a write operation in the memory system according to the embodiment.

Next, an overview of the write operation executed in the memory system 1 according to the present embodiment will be described with reference to FIG. 8. FIG. 8 is a diagram illustrating the overview of the write operation executed in the memory system 1 according to the present embodiment.

First, when receiving the write request from the host device 2, the memory controller 20 converts the logical address provided in the received write request into the physical address ADD by using the L2P table 30_1 stored in the buffer memory 30. After that, the memory controller 20 transmits the physical address ADD (that is, the physical address ADD indicating a storage destination of the write data) obtained by using the L2P table 30_1 to the NAND memory 10 as the address information. At this time, the memory controller 20 may issue the write command in response to the write request received from the host device 2 and transmit the write command together with the address information to the NAND memory 10.

When receiving the address information from the memory controller 20, the NAND memory 10 specifies the read feature information corresponding to the received address information by using the read feature management table 15D_2 stored in the register 15D and transmits the specified read feature information to the memory controller 20.

Herein, the read feature management table 15D_2 stored in the register 15D will be described with reference to FIG. 9. FIG. 9 illustrates an example of the read feature management table 15D_2. The read feature management table 15D_2 manages the feature of each address of the NAND memory 10, which is the feature related to data reading. As illustrated in FIG. 9, the address information and the read feature information are correlated with each other in the read feature management table 15D_2. The address information indicates the physical address ADD (for example, the physical addresses ADD1, ADD2, ADD3, and the like) designating the memory cell provided in the NAND memory 10. The read feature information indicates read feature CHA_R (for example, read feature CHA_R1, CHA_R2, CHA_R3, and the like) and indicates information on the operation content which is required for reading data from the memory cell designated by the correlated address information (physical address ADD). For example, the read feature information indicates the read voltage value when the data is read from the memory cell designated by the correlated address information (physical address ADD) as the read feature CHA_R.

Referring back to FIG. 8, the description will be made. When receiving the read feature information from the NAND memory 10, the memory controller 20 specifies the write operation setting information corresponding to the received read feature information by using the write operation setting table 30_3 stored in the buffer memory 30 and executes the write operation based on the specified write operation setting information. More specifically, the memory controller 20 transmits at least the write command corresponding to the write request received from the host device 2, the write data based on the write request, and the physical address ADD indicating the storage destination of the write data to the NAND memory 10 and further transmits the command based on the specified write operation setting information to the NAND memory 10 as needed.

Herein, the write operation setting table 30_3 stored in the buffer memory 30 will be described with reference to FIG. 10. FIG. 10 illustrates an example of the write operation setting table 30_3 stored in the buffer memory 30. As illustrated in FIG. 10, in the write operation setting table 30_3, the read feature information and the write operation setting information are correlated with each other. The write operation setting information indicates a write operation setting OPE_W (for example, write operation settings OPE_W1, OPE_W2, OPE_W3, and the like), and indicates information on the setting for executing the write operation of writing data to a memory cell at an address having the read feature CHA_R indicated by the correlated read feature information.

For example, the write operation setting information indicates an optimal increased value $\Delta VPGM$ (boost value, boost interval) of a program voltage applied to the word line connected to the memory cell at the address having the read feature CHA_R indicated by the correlated read feature information as the write operation setting OPE_W. According to this, the memory controller 20 can execute the write operation using the optimal increased value $\Delta VPGM$ for the memory cell designated by the physical address ADD corresponding to the logical address provided in the write request received from the host device 2. It is noted that, in the write operation of the present embodiment, the optimum denotes that desirable results are obtained with respect to, for example, time, power consumption, and damage to the memory cell. Specifically, for example, the optimal increased value $\Delta VPGM$ may be an increased value $\Delta VPGM$ that takes the shortest time to complete the write operation. In addition, the optimal increased value $\Delta VPGM$ may be an increased value $\Delta VPGM$ that consumes the least power in the write operation. The optimal increased value $\Delta VPGM$ may be an increased value $\Delta VPGM$ that causes the least damage to the memory cell. In other words, the optimum denotes that desirable results are obtained with respect to the conditions. The same applies to the optimal number of write loops to be described later.

For example, the write operation setting information indicates an optimal maximum value of the program voltage applied to the word line connected to the memory cell at the address having the read feature CHA_R indicated by the correlated read feature information as the write operation setting OPE_W. According to this, the memory controller 20 can execute the write operation using the optimal maximum value of the program voltage for the memory cell designated by the physical address ADD corresponding to the logical address provided in the write request received from the host device 2.

For example, the write operation setting information indicates an optimal maximum value of the number of write loops when writing data to the memory cell at the address having the read feature CHA_R indicated by the correlated read feature information as the write operation setting OPE_W. According to this, the memory controller 20 can execute the write operation using the optimal maximum value of the number of write loops for the memory cell designated by the physical address ADD corresponding to the logical address provided in the write request received from the host device 2.

Referring back to FIG. 8, the description will be made. When receiving at least the write command, the write data, and the physical address ADD from the memory controller 20, the NAND memory 10 writes the write data to the memory cell designated by the received physical address ADD and ends a series of write operations.

Figure 11:
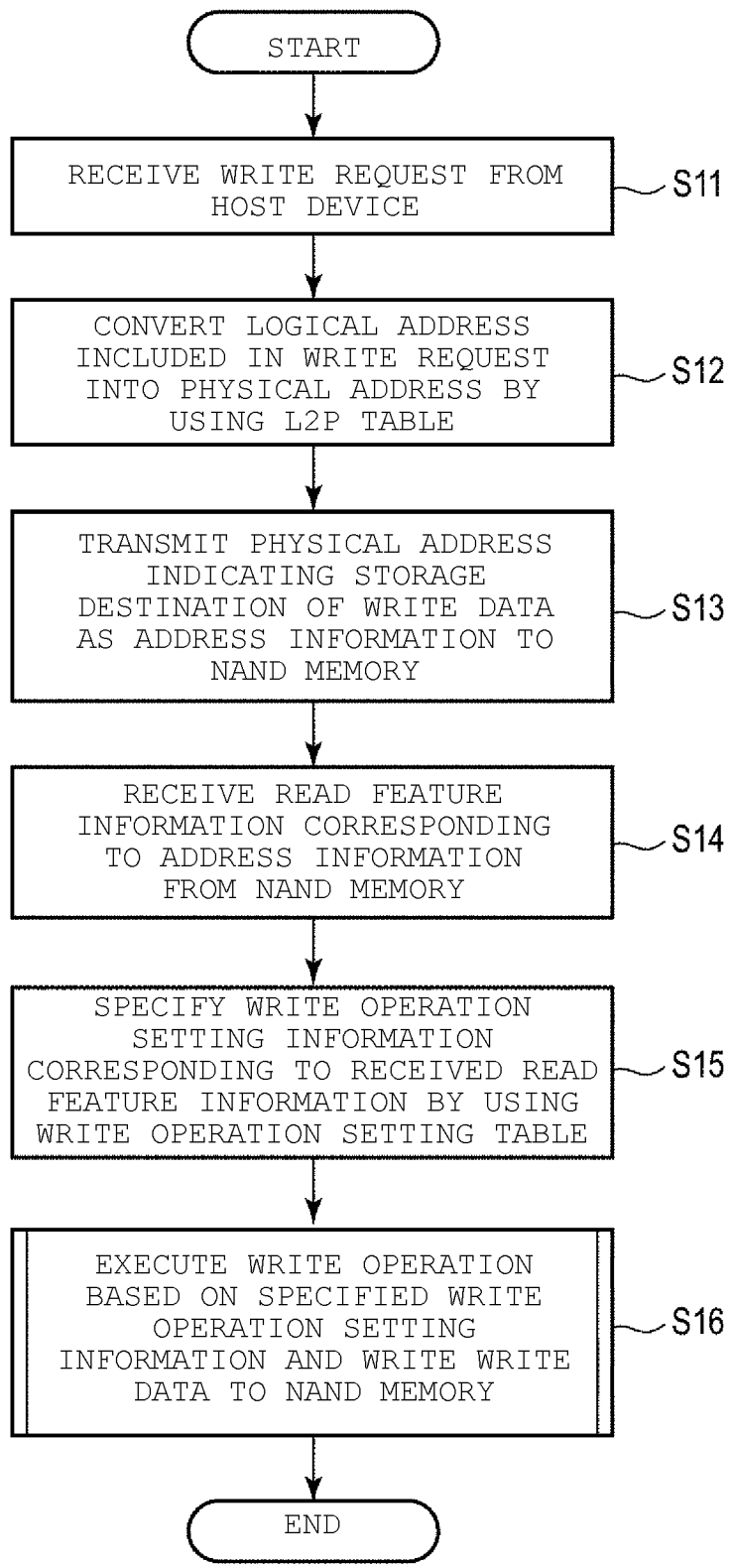
FIG. 11 is a flowchart illustrating an operation executed on the memory controller side of the write operation illustrated in FIG. 8.

FIG. 11 is a flowchart illustrating in more detail the operations executed on the memory controller 20 side of the series of write operations illustrated in FIG. 8.

First, the host interface 23 receives the write request from the host device 2 (step S11). The received write request is transferred from the host interface 23 to the CPU 21.

When receiving the write request transferred from the host interface 23, the CPU 21 converts the logical address provided in the write request into the physical address by using the L2P table 30_1 stored in the buffer memory 30 and specifies the physical address ADD indicating the storage destination of the write data based on the write request (step S12). The physical address ADD indicating the storage destination of the write data is transferred from the CPU 21 to the NAND interface 25 as the address information.

When receiving the address information transferred from the CPU 21, the NAND interface 25 transmits the address information to the NAND memory 10 (step S13) and receives the read feature information corresponding to the address information from the NAND memory 10 (step S14). The received read feature information is transferred from the NAND interface 25 to the CPU 21.

When receiving the read feature information transferred from the NAND interface 25, the CPU 21 specifies the write operation setting information corresponding to the read feature information by using the write operation setting table 30_3 stored in the buffer memory 30 (step S15). After that, the CPU 21 executes the write operation based on the specified write operation setting information, writes the write data to the NAND memory 10 (step S16), and ends the series of write operations.

Figure 12:
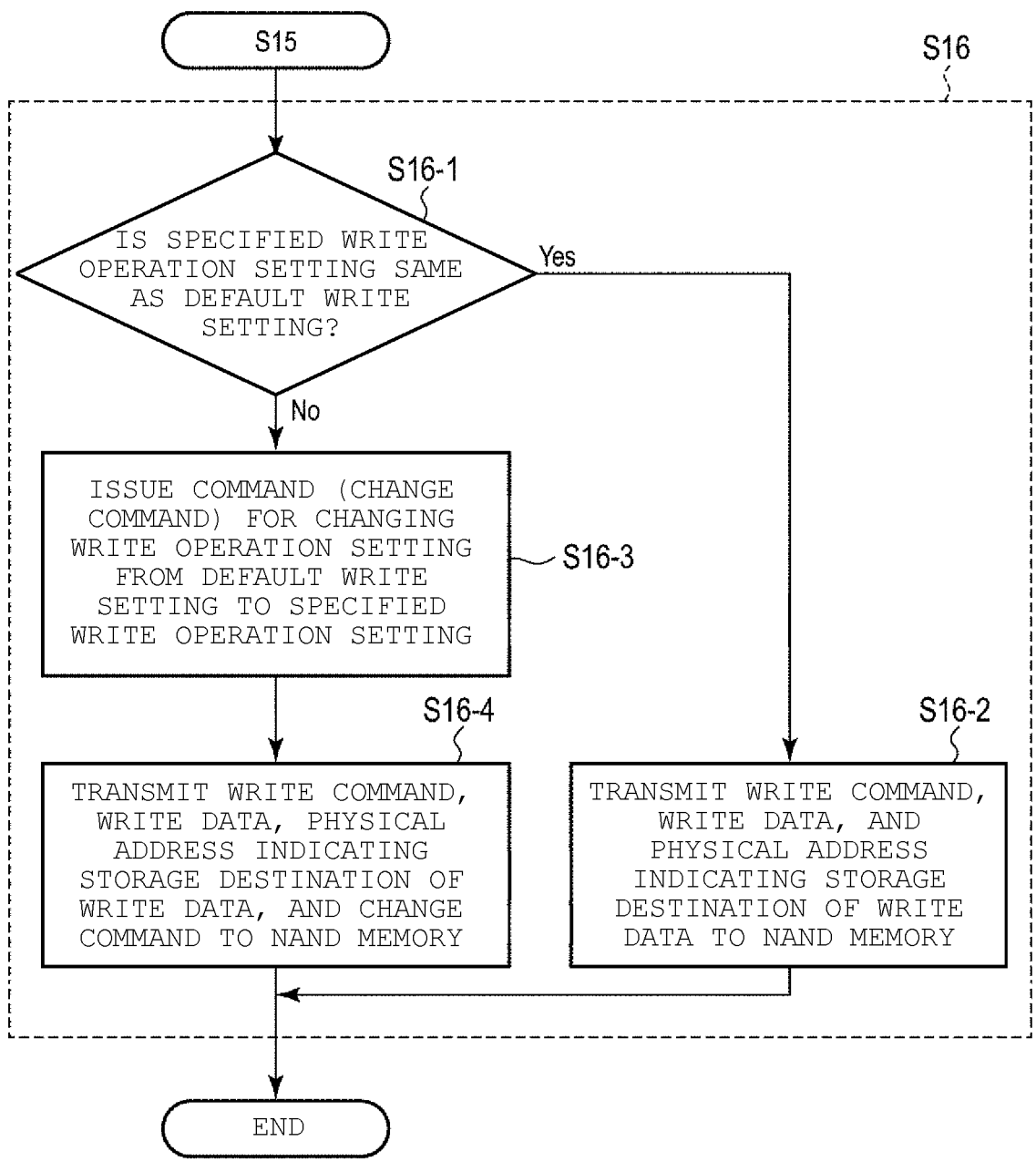
FIG. 12 is a detailed flowchart of a process of step S16 illustrated in FIG. 11.

Herein, the process of step S16 illustrated in FIG. 11 will be described in more detail with reference to FIG. 12. FIG. 12 is a flowchart illustrating in more detail the process of step S16 illustrated in FIG. 11.

First, the CPU 21 determines whether the write operation setting OPE_W indicated by the write operation setting information specified in the process of step S15 is the same as a default write operation setting (hereinafter referred to as a default write setting) (step S16-1).

In the process of step S16-1, when it is determined that the write operation setting OPE_W is the same as the default write setting (Yes in step S16-1), the CPU 21 determines that there is no need to change the write operation setting in order to execute the write operation on the memory cell designated by the physical address ADD specified in the process of step S12. The CPU 21 issues the write command in response to the write request received from the host device 2, transmits the write command, the write data based on the write request, and the physical address ADD indicating the storage destination of the write data to the NAND memory 10 via the NAND interface 25 (step S16-2), and ends the series of write operations.

On the other hand, in the process of step S16-1, when it is determined that the write operation setting OPE_W is different from the default write setting (No in step S16-1), the CPU 21 determines that the write operation setting needs to be changed in order to execute the write operation on the memory cell designated by the physical address ADD specified in the process of step S12. The CPU 21 issues a command (change command) for changing the write operation setting from the default write setting to the write operation setting OPE_W (step S16-3).

After that, the CPU 21 issues the write command in response to the write request received from the host device 2, transmits the write command, the write data based on the write request, the physical address ADD indicating the storage destination of the write data, and the change command issued in the process of step S16-3 to the NAND memory 10 via the NAND interface 25 (step S16-4), and ends the series of write operations.

As described above, the register 15D of the NAND memory 10 can store the read feature management table 15D_2, and the buffer memory 30 of the memory controller 20 can store the write operation setting table 30_3, so that the memory system 1 can specify the read feature CHA_R of the physical address ADD indicating the storage destination of the write data and can specify and apply the optimal write operation setting OPE_W (for example, the optimal increased value ΔVPGM, the optimal maximum value of the program voltage, the optimal maximum value of the number of write loops, and the like) for the memory cell designated by the physical address ADD based on the read feature CHA_R. According to this, since the memory system 1 can execute the write operation with the optimal write operation setting OPE_W (for example, the optimal increased value ΔVPGM, the optimal maximum value of the program voltage, the optimal maximum value of the number of write loops, and the like) for the memory cell designated by the physical address ADD indicating the storage destination of the write data, a data writing accuracy and a data writing speed can be improved.

In addition, since the read feature management table 15D_2 is stored in the register 15D in the NAND memory 10, the NAND memory 10 can specify the read feature information (read feature CHA_R) corresponding to the address information (physical address ADD) received from the memory controller 20 in a short period of time and can transmit the read feature information to the memory controller 20 in a short period of time.

In addition, as described above, the memory controller 20 may simply specify and apply the write operation setting OPE_W based on the read feature information (read feature CHA_R) received from the NAND memory 10. Since the memory controller 20 can specifically determine what kind of write operation the memory controller 20 associates the write operation setting OPE_W with, the memory controller 20 has a degree of freedom in operation selection.

In the embodiment described above, the case where the memory system 1 manages two features including the write feature CHA_W and the read feature CHA_R for each address, specifies the read operation setting OPE_R by using the write feature CHA_W when executing the read operation, and specifies the write operation setting OPE_W by using the read feature CHA_R when executing the write operation is described. However, the memory system 1 may manage one feature for each address, may specify the read operation setting OPE_R by using the one feature when executing the read operation, and may specify the write operation setting OPE_W by using the one feature when executing the write operation. In the following, such a case will be specifically described.

Figure 13:
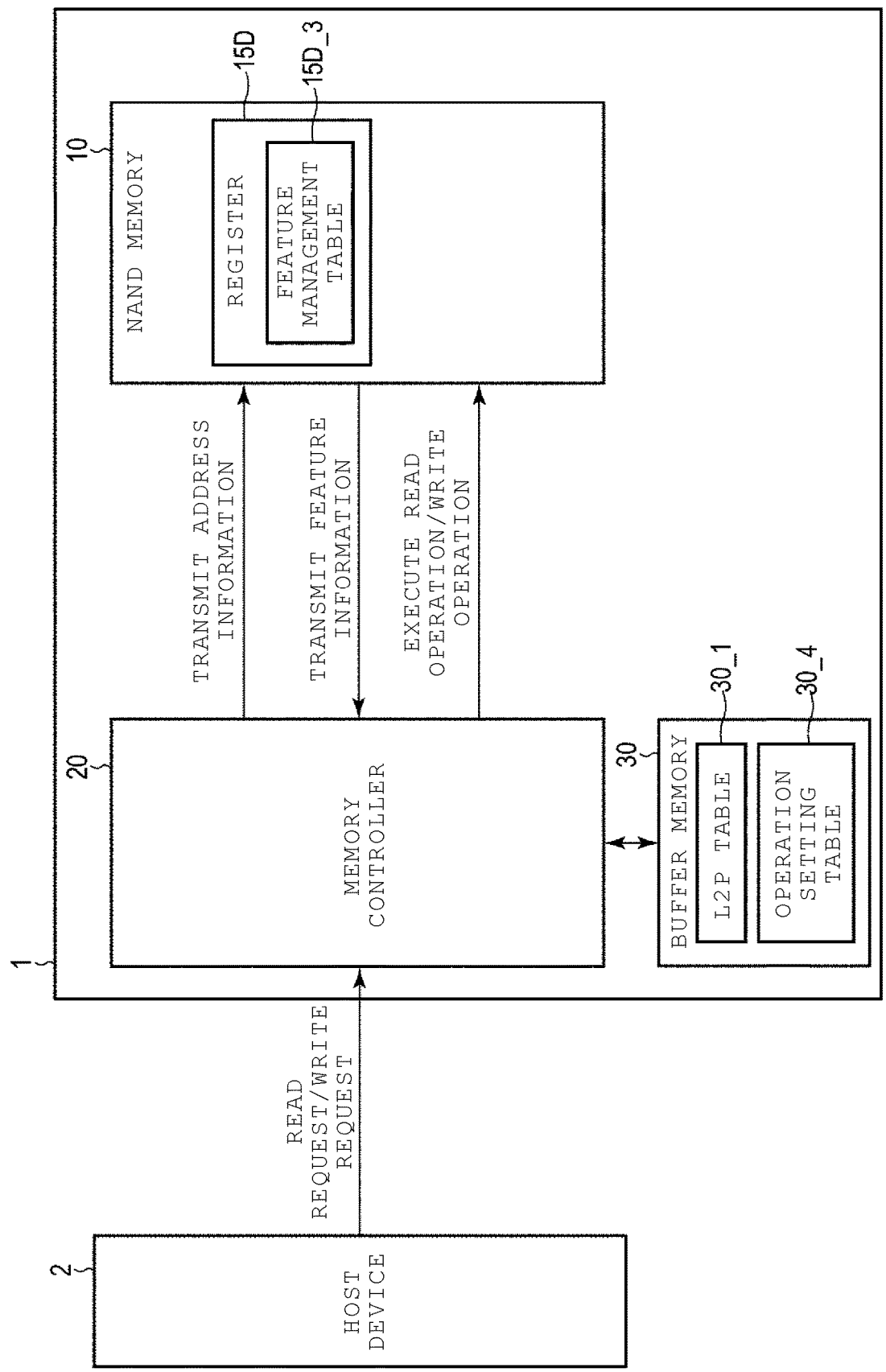
FIG. 13 is a diagram illustrating another example of the read operation or the write operation in the memory system according to the embodiment.

FIG. 13 is a diagram illustrating an overview of another example of the read operation or the write operation executed in the memory system 1 according to the present embodiment. In this example, as illustrated in FIG. 13, a feature management table 15D_3 is stored in the register 15D of the NAND memory 10, and an operation setting table 30_4 is stored in the buffer memory 30.

FIG. 14 illustrates an example of the feature management table 15D_3 stored in the register 15D of the NAND memory 10. The feature management table 15D_3 manages the feature of each address of the NAND memory 10, and similarly to the write feature management table 15D_1 and the read feature management table 15D_2, the feature management table 15D_3 is loaded from the memory cell array 11 into the register 15D when the memory system 1 is powered on. As illustrated in FIG. 14, the address information and the feature information are correlated with each other in the feature management table 15D_3. The address information indicates the physical address ADD (for example, the physical addresses ADD1, ADD2, ADD3, and the like) designating the memory cell provided in the NAND memory 10. The feature information indicates information on the feature of the memory cell designated by the correlated address information (physical address ADD) as the address feature CHA (for example, address feature CHA_1, CHA_2, CHA_3, and the like).

FIG. 15 illustrates an example of the operation setting table 30_4 stored in the buffer memory 30. As illustrated in FIG. 15, in the operation setting table 30_4, the feature information, the read operation setting information, and the write operation setting information are correlated with each other.

The read operation setting information indicates the read operation setting OPE_R (for example, the read operation settings OPE_R1, OPE_R2, OPE_R3, and the like) similarly to the read operation setting table 30_2 illustrated in FIG. 5, and indicates information on the setting for executing the read operation of reading data from the memory cell at the address having the address feature CHA indicated by the correlated feature information. For example, the read operation setting information indicates an optimal read voltage value when reading data from the memory cell at the address having the address feature CHA indicated by the correlated feature information as the read operation setting OPE_R.

The write operation setting information indicates the write operation setting OPE_W (for example, the write operation settings OPE_W1, OPE_W2, OPE_W3, and the like) similarly to the write operation setting table 30_3 illustrated in FIG. 10, and indicates information on the setting for executing the write operation of writing data to the memory cell at the address having the address feature CHA indicated by the correlated feature information. For example, the write operation setting information indicates an optimal increased value ΔVPGM of the program voltage applied to the word line connected to the memory cell at the address having the address feature CHA indicated by the correlated feature information as the write operation setting OPE_W.

Referring back to FIG. 13, the description will be made. First, when receiving the read request or the write request from the host device 2, the memory controller 20 converts the logical address provided in the received read request or the received write request into the physical address ADD by using the L2P table 30_1 stored in the buffer memory 30. After that, the memory controller 20 transmits the physical address ADD (that is, the physical address ADD indicating the storage position of the read data) obtained by using the L2P table 30_1 to the NAND memory 10 as the address information.

When receiving the address information from the memory controller 20, the NAND memory 10 specifies the feature information corresponding to the received address information by using the feature management table 15D_3 stored in the register 15D, and transmits the specified feature information to the memory controller 20.

When receiving the above-described feature information as the response to the address information transmitted to the NAND memory 10 in response to the read request from the host device 2, the memory controller 20 specifies the read operation setting information corresponding to the received feature information by using the operation setting table 30_4 stored in the buffer memory 30 and executes the read operation based on the specified read operation setting information. On the other hand, when receiving the feature information as the response to the address information transmitted to the NAND memory 10 in response to the write request from the host device 2, the memory controller 20 specifies the write operation setting information corresponding to the received feature information by using the operation setting table 30_4 stored in the buffer memory 30 and executes the write operation based on the specified write operation setting information.

As described above, the register 15D of the NAND memory 10 stores the feature management table 15D_3, and the buffer memory 30 of the memory controller 20 stores the operation setting table 30_4, so that the memory system 1 can execute an operation similar to the read operation illustrated in FIG. 3 or the write operation illustrated in FIG. 8 without managing the two features including the write feature and the read feature. That is, when receiving the read request from the host device 2, the memory system 1 can specify the address feature CHA of the physical address ADD indicating the storage position of the read data, and can specify and apply the optimal read operation setting OPE_R (for example, the optimal read voltage value, the optimal auxiliary function, the optimal function, and the like) for the memory cell designated by the physical address ADD indicating the storage position of the read data based on the address feature CHA, and thus, the data reading accuracy and the data reading speed can be improved. In addition, when receiving the write request from the host device 2, the memory system 1 can specify the address feature CHA of the physical address ADD indicating the storage destination of the write data, and can specify and apply the optimal write operation setting OPE_W (for example, the optimal increased value ΔVPGM, the optimal maximum value of the program voltage, the optimal maximum value of the number of write loops, and the like) for the memory cell designated by the physical address ADD indicating the storage destination of the write data based on the address feature CHA, and thus, the data writing accuracy and the data writing speed can be improved.

In addition, since the feature management table 15D_3 is stored in the register 15D in the NAND memory 10, the NAND memory 10 can specify the feature information (address feature CHA) corresponding to the address information (physical address ADD) received from the memory controller 20 in a short period of time and can transmit the feature information to the memory controller 20 in a short period of time.

Next, an update process for updating the feature management table 15D_3 will be described with reference to FIG. 16.

According to the series of operations illustrated in FIG. 13, the read operation setting OPE_W corresponding to the address feature CHA of each address can be specified and the optimal read operation can be executed based on the read operation setting OPE_W. However, since whether the read operation is optimal is determined after executing the read operation, the read operation might not be the optimal read operation.

Whether the read operation is an optimal read operation can be determined, for example, based on whether an error is detected by the error correction process of the ECC circuit 24 and the read voltage value is adjusted. It is noted that the method of determining whether the read operation is the optimal read operation is not limited to this determination method. When an error is detected by the error correction process of the ECC circuit 24, the memory controller 20 (memory system 1) repeatedly executes the read operation by adjusting the read voltage value. For this reason, when an error is detected by the error correction process of the ECC circuit 24 and the read operation is repeatedly executed by adjusting the read voltage value, the memory controller 20 (memory system 1) determines that the executed read operation is not an optimal read operation and updates the feature information of the address that is a target of the executed read operation based on finally executed read operation. In other words, the memory controller 20 updates the feature information indicating the address feature CHA used to specify the read operation setting OPE_R used in the executed read operation and transmits the updated feature information to the NAND memory 10. When receiving the updated feature information, the NAND memory 10 reflects the received updated feature information in the feature management table 15D_3 stored in the register 15D. On the other hand, when no error is detected by the error correction process of the ECC circuit 24 and the executed read operation is an optimal read operation, the memory controller 20 (memory system 1) does not update the feature information of the address that is a target of the executed read operation.

In addition, according to the series of operations illustrated in FIG. 13, The write operation setting OPE_W corresponding to the address feature CHA of each address can be specified and the optimal write operation can be executed based on the write operation setting OPE_W. However, since whether the write operation is optimal is determined after executing the write operation, the write operation might not be the optimal write operation.

Whether the write operation is the optimal write operation can be determined, for example, based on whether the number of write loops is a predetermined threshold value or more. Alternatively, whether the write operation is the optimal write operation can be determined, for example, based on whether the time taken to complete the write operation is a predetermined threshold value or more. Alternatively, whether the write operation is the optimal write operation can be determined, for example, based on whether the number of fail bits remaining after the completion of the write operation is a predetermined threshold value or more. It is noted that the method of determining whether the write operation is the optimal write operation is not limited to the determination method described above.

When the memory controller 20 (memory system 1) determines that the executed write operation is not the optimal write operation as the result of determination by at least one of the determination methods described above (for example, when the number of write loops is the predetermined threshold value or more, when the time taken to complete the write operation is the predetermined threshold value or more, when the number of fail bits remaining after the completion of the write operation is the predetermined threshold value or more, and the like) the feature information of the address that is a target of the executed write operation is updated based on the executed write operation. In other words, the memory controller 20 updates the feature information indicating the address feature CHA used to specify the write operation setting OPE_W used in the executed write operation and transmits the updated feature information to the NAND memory 10. When receiving the updated feature information, the NAND memory 10 reflects the received updated feature information in the feature management table 15D_3 stored in the register 15D. On the other hand, if the executed write operation is the optimal write operation as a result of determination by at least one of the determination methods described above, the memory controller 20 (memory system 1) does not update the feature information of the address that is a target of the executed write operation.

By executing the above-described update process illustrated in FIG. 16, when the read operation or the write operation is to be executed again by using the address of this time as a target, since the memory system 1 can specify and apply the read operation setting OPE_R or the write operation setting OPE_W based on the updated feature information (address feature CHA), the memory system 1 can execute the optimal read operation or the optimal write operation for the memory cell designated by the address. It is noted that the update process illustrated in FIG. 16 may be executed after the series of read operations illustrated in FIG. 3 or the series of write operations illustrated in FIG. 8. When the update process described above is executed after the read operation illustrated in FIG. 3, the memory controller 20 updates the read feature information indicating the read feature CHA_R of the address of the read target based on the last read operation. In addition, when the update process described above is executed after the write operation illustrated in FIG. 8, the memory controller 20 updates the write feature information indicating the write feature CHA_W of a write target address based on the executed write operation.

According to the embodiment described above, the memory system 1 manages the feature of each address in the register 15D of the NAND memory 10, and before executing the read operation or the write operation, specifies and applies the read operation setting OPE_R or the write operation setting OPE_W based on the feature of the read target address (for example, the read feature CHA_R) or the feature of the write target address (for example, the write feature CHA_W), and can execute the read operation or the write operation. According to this, the response performance of the memory system 1 and the NAND memory 10 can be improved. That is, the data reading accuracy, the data reading speed, the data writing accuracy, and the data writing speed in the memory system 1 and the NAND memory 10 can be improved.

While certain embodiments have been described, these embodiments have been presented by way of example only, and are not intended to limit the scope of the disclosure. Indeed, the novel embodiments described herein may be embodied in a variety of other forms; furthermore, various omissions, substitutions and changes in the form of the embodiments described herein may be made without departing from the spirit of the disclosure. The accompanying claims and their equivalents are intended to cover such forms or modifications as would fall within the scope and spirit of the disclosure.

What is claimed is:

1. A memory system comprising:
a non-volatile memory that includes a memory cell array and a register storing first table data including feature information indicating a feature of an address designating a storage area in the memory cell array; and
a controller configured to control the non-volatile memory, wherein
when receiving address information indicating the address from the controller, the non-volatile memory reads the feature information from the first table data in the register and transmits the feature information to the controller,
when receiving the feature information from the non-volatile memory, the controller executes a response operation in response to a request with respect to the address based on the received feature information, and
the response operation is a read operation or a write operation.

2. The memory system according to claim 1, wherein the non-volatile memory stores the first table data in the register back into the memory cell array when the non-volatile memory is powered off, and loads the first table data in the memory cell array into the register when the non-volatile memory is powered on.

3. The memory system according to claim 1, wherein the controller is configured to store second table data including setting information on a setting for executing the response operation, specify the setting information indicated by the received feature information by using the second table data, and execute the response operation based on the specified setting information.

4. The memory system according to claim 3, wherein
when executing a second response operation different from the response operation based on the specified setting information, the controller is configured to update the received feature information based on the second response operation and transmit the updated feature information to the non-volatile memory, and
when receiving the updated feature information from the controller, the non-volatile memory reflects the updated feature information in the first table data in the register.

5. The memory system according to claim 1, wherein
when receiving a read request to read data stored in the storage area, the controller is configured to transmit the address information indicating the address to the non-volatile memory, and
when receiving the address information transmitted from the controller in response to the read request, the non-volatile memory reads the feature information indicating write feature of the address from the first table data and transmits the feature information to the controller.

6. The memory system according to claim 5, wherein the controller is configured to store second table data including setting information on a setting for executing the read operation according to the write feature of the address, specify the setting information corresponding to the write feature of the address indicated by the received feature information by using the second table data, and execute the read operation based on the specified setting information.

7. The memory system according to claim 1, wherein
when receiving a write request to write data to the storage area, the controller is configured to transmit the address information indicating the address to the non-volatile memory, and
when receiving the address information transmitted from the controller in response to the write request, the non-volatile memory reads the feature information indicating read feature of the address from the first table data and transmits the feature information to the controller.

8. The memory system according to claim 7, wherein the controller is configured to store second table data including setting information on a setting for executing the write operation according to the read feature of the address, specify the setting information corresponding to the read feature of the address indicated by the received feature information by using the second table data, and execute the write operation based on the specified setting information.

9. The memory system according to claim 1, wherein the controller is connected to a host device.

10. A non-volatile memory comprising:
an input/output circuit that is connected to a controller;
a memory cell array that stores data; and
a register that stores first table data including feature information indicating a feature of an address designating a storage area in the memory cell array, wherein
when receiving address information indicating the address from the controller, the input/output circuit reads the feature information corresponding to the address from the first table data in the register and transmits the feature information to the controller, and
one of a read operation or a write operation is executed based on the feature information.

11. The non-volatile memory according to claim 10, wherein the first table data in the register can be stored in the memory cell array, and the first table data stored in the memory cell array can be loaded into the register.

12. The non-volatile memory according to claim 10, wherein the feature information includes information on a write operation content which is required for writing data to the storage area designated by the address.

13. The non-volatile memory according to claim 12, wherein the information on the write operation content includes the number of times of write voltage application when data is written into the storage area designated by the address.

14. The non-volatile memory according to claim 12, wherein the read operation is executed according to the write operation content.

15. The non-volatile memory according to claim 10, wherein the feature information includes information on a read operation content which is required for reading data from the storage area designated by the address.

16. The non-volatile memory according to claim 15, wherein the information on the read operation content includes a read voltage value when data is read from the storage area designated by the address.

17. The non-volatile memory according to claim 15, wherein the write operation is executed according to the read operation content.

18. A memory system comprising:
a non-volatile memory that includes a register and a memory cell array including a storage area; and
a controller configured to control the non-volatile memory, wherein
the non-volatile memory is configured to:
store a first table to the register, the first table including feature information indicating a feature of the storage area designated by address information; and
in response to receiving the address information from the controller, transmit the feature information in the first table in the register to the controller, and
the controller is configured to:
receive a request from a host, the request being a read request or a write request; and
in response to receiving the feature information from the non-volatile memory, transmit a command in response to the request to the non-volatile memory, the command being determined based on the received feature information.

19. The memory system according to claim 18, wherein the controller is configured to:
store a second table including setting information correlated with the feature information; and
determine the command based on the setting information.

* * * * *